Feb. 19, 1957 W. F. HOLIN 2,781,872
SLACK ADJUSTING CONNECTION
Filed July 20, 1954 2 Sheets-Sheet 1

Inventor
William F. Holin
By
J. C. Thorpe
Attorney

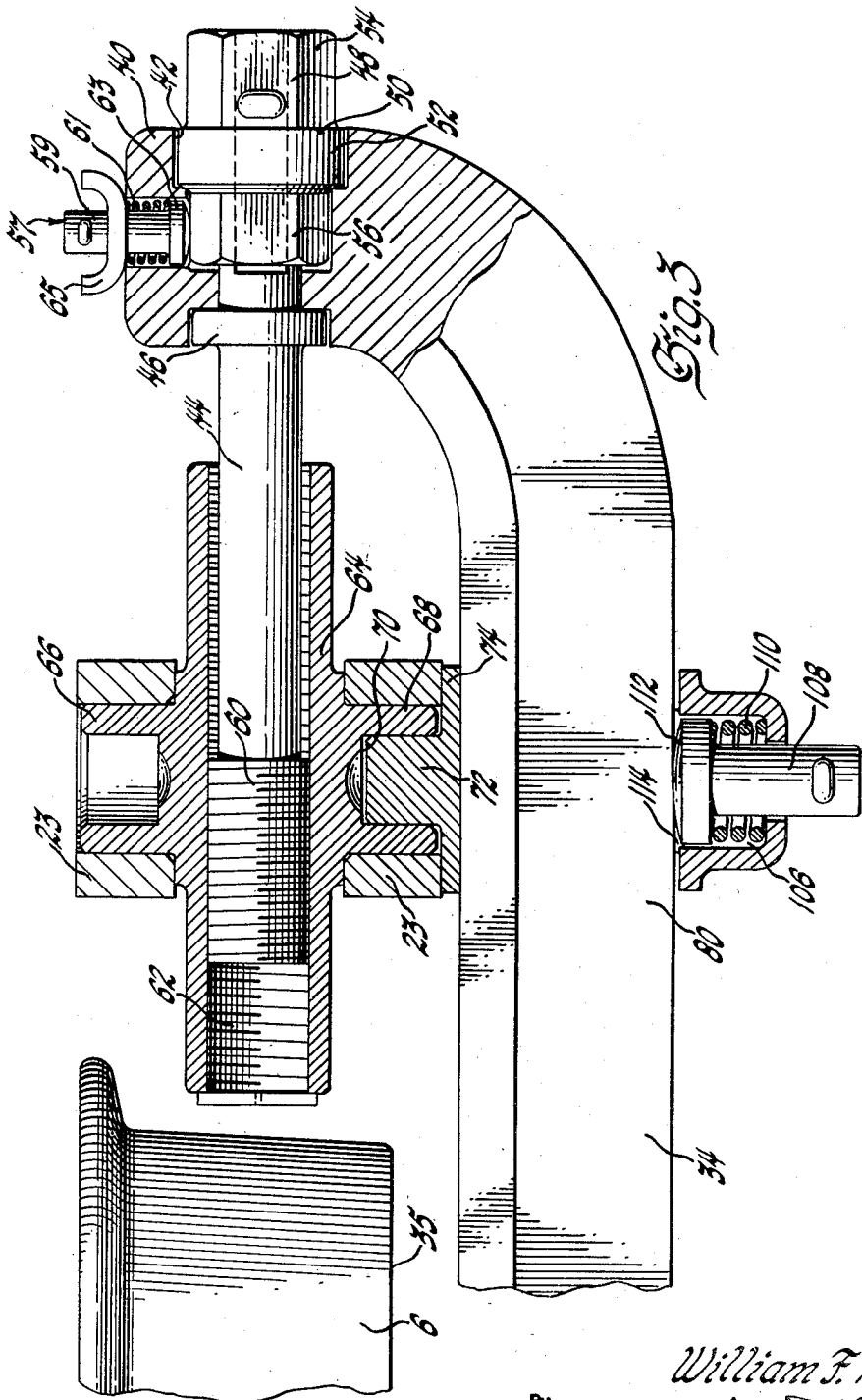

United States Patent Office 2,781,872
Patented Feb. 19, 1957

2,781,872

SLACK ADJUSTING CONNECTION

William F. Holin, Riverside, Ill., assignor to General Motors Corporation, Detroit, Mich., a corporation of Delaware Application July 20, 1954, Serial No. 444,513

9 Claims. (Cl. 188—202)

This invention relates generally to brake rigging for railway vehicles and more particularly to slack adjusting means for a clasp type brake rigging in which a single horizontal tension bar is utilized to connect the lower ends of the vertical live and dead brake levers.

It is an object of this invention to provide a simplified but novel slack adjusting means in which the slack adjusting bolt may extend completely through the pivotal point of connection of the vertical brake lever to the slack adjusting nut to thereby give greater adjustment and enable that portion of the slack adjusting assembly extending away from the braked wheel to be shortened.

It is a further object of this invention to in part guide the movement of the slack adjusting nut by novel spring-loaded means engaging the outboard side of the single horizontal tension bar.

It is a further object of this invention to provide a slack adjuster in which the slack adjusting bolt extends through a turned end of the horizontal tension bar and which is yieldingly retained in the position to which it is turned by means of a novel spring detent engaging flat surfaces on the hexagonal surfaces of the slack adjusting bolt.

For further objects of this invention reference may be had to the accompanying detailed description and drawings, in which:

Fig. 3 is an enlarged view partly in section with portions broken away taken on the line 3—3 of Fig. 2 and further illustrates details of this novel slack adjusting means.

Figures 1, 2:
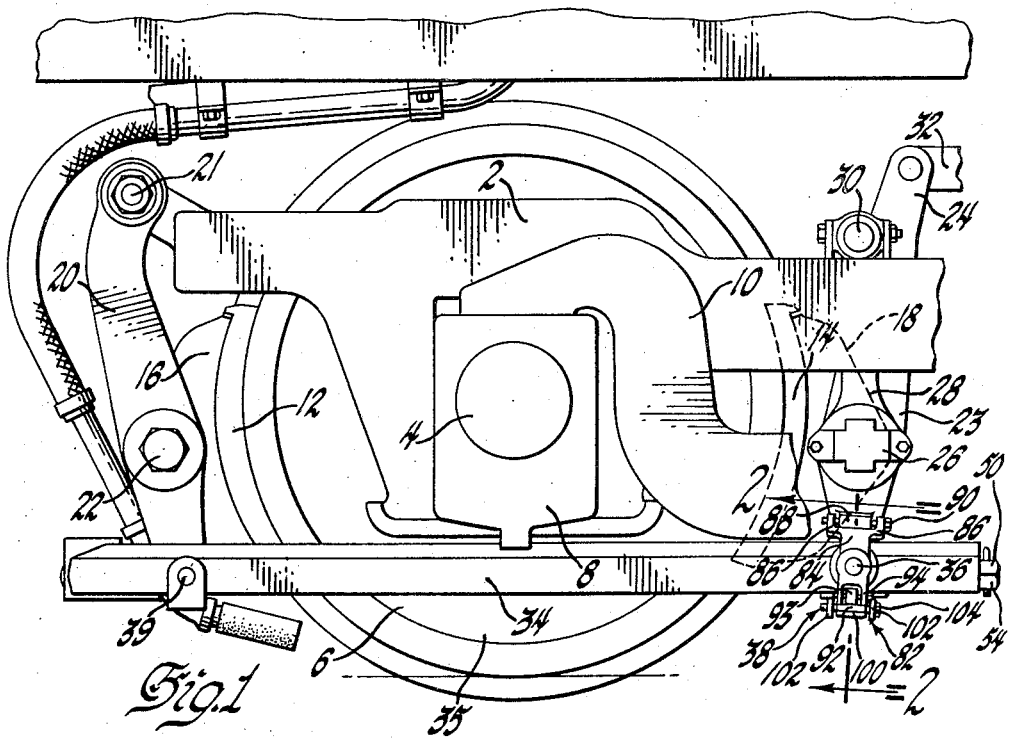
Fig. 1 is a general side view in elevation of the brake rigging in which this new slack adjusting means is incorporated.
Fig. 2 is an enlarged view in section taken on the line 2—2 of Fig. 1 to illustrate certain details of this novel slack adjusting means and the manner in which it has been combined with the means pivotally attaching the lower end of the live vertical brake lever to one end of the horizontal tension bar.

Referring now to the accompanying drawings and particularly to Fig. 1 the reference numeral 2 indicates the frame of a railway vehicle truck in which the axle 4 carrying the wheels 6 is journalled in the usual manner in journal boxes 8. The reference character 10 indicates an equalizer bar the ends of which rest on top of the journal boxes 8. The brake rigging shown is of the clasp type and comprises brake shoes 12 and 14 adapted to be forced against the opposite sides of the wheels 6. The shoes 12 and 14 are carried on brake heads 16 and 18, respectively. The brake head 16 is pivotally mounted at the point 22 between a pair of vertical dead brake levers 20 pivotally supported on the frame 2 at 21. The brake head 18 is pivotally mounted between outboard and inboard bifurcations 23 of a vertical live brake lever 24 at the point 26 and is pivotally supported at point 26 by a pair of hangers 28 which are pivotally secured to the truck frame 2 at 30. Operatively connected to the upper end of vertical live brake lever 24 is an operating rod 32 which is operatively connected to a brake cylinder (not shown) for actuation thereby.

Connected to the lower ends of the vertical dead brake lever 20 and the vertical live brake lever 24 is a horizontal tension bar 34 comprising a single horizontally disposed bar having a longitudinally extending section located adjacent the outer face 35 of wheel 6. The horizontal tension bar 34 is attached to the lower end of the vertical live brake lever 24 at 36 by means indicated generally by a numeral 38 and to the vertical dead brake lever 20 at point 39.

General operation of the clasp brake rigging is accomplished by movement of the operating rod 32 to the left as viewed in Fig. 1 by means of a brake cylinder (not shown). This movement of operating rod 32 will cause vertical live brake lever 24 to pivot counterclockwise about the point 36 until the brake shoe 14 engages the wheel 6. After the brake shoe 14 engages wheel 6 further counterclockwise pivotal movement of the lever 24 will take place about point 26 causing the horizontal tension bar 34 to move to the right as viewed in Fig. 1. Movement of horizontal tension bar 34 to the right also moves point 39 to the right and causes vertical dead brake lever 20 to pivot counterclockwise about point 21 until brake shoe 12 engages wheel 6 at which time full clasp braking may be accomplished.

The means 38 which includes the novel slack adjusting means forming the main subject matter of this invention is more particularly shown in Figs. 2 and 3. Referring to these latter figures it will be noted that the end 40 of the horizontal tension bar 34 adjacent the means 38 is bent inwardly or formed so that it extends through and is perpendicular to the plane of wheel 6. The end 40 is provided with a hole 42 of variable diameter for the reception of a slack adjusting bolt 44. The slack adjusting bolt 44 is provided with a flange 46 intermediate the ends thereof. On the right-hand side of flange 46 as viewed in Fig. 3 is a shank 48 which is threaded and has screwed thereon a slack adjusting bolt head 50. The slack adjusting bolt head 50 has a circular flange 52 intermediate the ends thereof enabling the bolt head 50 to be rotated in hole 42. On either side of flange 52 bolt head 50 is provided with hexagonal portions 54 and 56, the hexagonal portion 54 being for the purpose of applying a suitable tool to rotate head 50 and bolt 44.

The hexagonal portion 56 has a special purpose and is used to yieldingly maintain the slack adjusting bolt and head in whatever position it is turned to by spring detent means 57 which engage the flat surfaces thereof. The spring detent means 57 include a plunger 59 loaded by a spring 61 acting between the head 63 of the plunger 59 and a small plate 65 tack-welded or otherwise suitably secured to the end 40. The detent means 57, although sufficiently strong to prevent turning of slack adjusting bolt due to vibration or other inertia or accidental forces applied thereto, will yield to allow turning when a tool is placed on head 50 and sufficient torque is applied. This feature saves the time usually wasted in the removal of locking nuts, hinges, etc., found on other types of slack adjusters during adjustment of the brakes. The flanges 46 and 52 are provided for the purpose of retaining the slack adjusting bolt and the bolt head 50 in the hole 42 while at the same time enabling them to be rotated therein.

It will be observed from Fig. 3 that the left-hand end 60 of slack adjusting bolt 44 extends into a threaded passage 62 in a crosshead member or slack adjusting nut 64. The slack adjusting nut 64 is provided with hollow trunnions 66 and 68 which are embraced in holes in the lower ends of the bifurcations 23 of vertical live brake lever 24. Extending into the bore 70 of hollow trunnion 68 is a cylindrical projection 72 formed on a plate 74 which in turn has thickened projecting flanges 76 and 78 adapted to partially embrace and support a portion 80 of the horizontal tension bar adjacent the end 40 thereof. The portion 80 is maintained in engagement with the plate 74 and prevented from rattling between the thickened flanges 76 and 78 by a strap assembly indicated generally by a numeral 82. The strap assembly 82 includes an upper strap 84 having its upper end formed with bifurcations 86 which are connected by a pin 90 to a boss 88 provided on the outboard bifurcation 23 of vertical live brake lever 24 above the lower end thereof. The strap assembly 82 also includes a lower strap 92 having a bossed end 93 connected by a pin 96 between bifurcations 94 provided on the lower end of strap 84. Strap 92 is provided with a second bossed end 100 which is connected by a pin 104 between bifurcations 102 on the lower end of the inboard bifurcation 23 of the vertical live brake lever 24. A recess or pocket 106 is provided in the strap 84 and contains a plunger 108 which is loaded by means of a helical spring 110 so that the base 112 of plunger 108 engages the outboard surface 114 of portion 80 and holds it in frictional engagement with plate 74 to, as already mentioned, prevent play and rattling therebetween.

From the foregoing description it may be appreciated that the distance between the wheel and brake shoe 14 is varied by turning of slack adjusting bolt 44 which actually changes the effective length of the horizontal tension bar 34 relative to the lower end of the live brake lever 24.

It should be emphasized at this point that the slack adjusting bolt 44 is capable of passing completely through the point where the vertical live brake lever 24 is connected to the slack adjusting nut 64. This is believed to be a novel feature of applicant's invention since by providing a device in which the slack adjusting bolt can pass completely through this pivotal point a more refined and greater adjustment for taking up slack is provided and the need for a slack adjuster having a relatively long portion extending away from the wheel to be braked is obviated.

It is to be further emphasized that this new slack adjusting means, although novel, is extremely simple and represents a substantial improvement over the prior art in the simple manner in which it is combined with the means for pivotally attaching the end of a vertical brake lever to the end of a single horizontal tension bar.

As described, the member 74 embraces the portion 80 of tension bar 34 and in combination with the strap assembly 82 uniquely guides the lower ends of bifurcations 23 of vertical brake lever 24 and the slack adjusting nut 64 along tension bar 34 as the slack adjusting bolt 44 is turned by head 50. This also deserves emphasis as a feature of applicant's invention.

I claim:

1. In a clasp brake rigging the combination of a tension bar having an offset end integral therewith, an elongated member supported by said offset end of said bar and spaced from and parallel to said bar, a crosshead member guided by said bar and having a hole through which said elongated member extends, a brake lever, means connecting the lower end of said lever to said crosshead member, and means to move said crosshead member to different positions along said elongated member whereby the effective length of said bar relative to the lower end of said lever is adjustable.

2. In a clasp brake rigging, the combination of a single tension bar therefor having a substantially horizontal longitudinally extending portion and an end integral therewith turned transversely to extend substantially at right angles to said portion, an elongated member supported by said end and extending at right angles therefrom and spaced from and parallel to said substantially horizontal longitudinally extending portion, a crosshead member having a hole through which said elongated member extends, a vertical brake lever, means pivotally connecting the lower end of said lever to said cross head member, and means to move said crosshead member to different positions along said elongated member whereby the effective length of said bar relative to the lower end of said lever is adjustable.

3. In a clasp brake rigging, the combination of a single tension bar therefor having a substantially horizontal longitudinally extending portion and an end integral therewith turned transversely to extend substantially at right angles to said portion, a threaded slack adjusting bolt extending through said end and at right angles thereto and spaced from and parallel to said substantially horizontal longitudinally extending portion, a slack adjusting nut having a threaded hole through which said slack adjusting bolt extends, a vertical brake lever, means pivotally connecting the lower end of said lever to said slack adjusting nut, said slack adjusting bolt being turnable in said end of said tension bar to move said slack adjusting nut along the threads of said bolt whereby the effective length of said bar relative to the lower end of said lever is adjustable.

4. In a clasp brake rigging, the combination of a single tension bar therefor having a substantially horizontal longitudinally extending portion and an end integral therewith turned transversely to extend substantially at right angles to said portion, an elongated member supported by said end and extending at right angles therefrom and spaced from and parallel to said substantially horizontal longitudinally extending portion, a crosshead member having a hole through which said elongated member extends, a vertical brake lever, means pivotally connecting the lower end of said lever to said crosshead member, a strap assembly cooperating with said vertical lever to embrace said bar spaced from said end to prevent movement of said bar away from said lever while allowing relative movement of said end and lever and means to move said crosshead member to different positions along said elongated member whereby the effective length of said bar relative to the lower end of said lever is adjustable, said crosshead member being movable along said elongated member so that said elongated member extends completely through the point of pivotal connection of said lever to said crosshead member.

5. In a clasp brake rigging, the combination of a single tension bar therefor having a substantially horizontal longitudinally extending portion and having integral therewith an end turned transversely to extend substantially at right angles to said portion, a threaded bolt extending through said end and at right angles thereto and spaced from and parallel to said substantially horizontal longitudinally extending portion, a slack adjusting nut having a threaded hole therein through which said slack adjusting bolt extends, a vertical brake lever, means pivotally connecting the lower end of said lever to said slack adjusting nut, guide means attached to said slack adjusting nut and embracing said horizontal tension bar at points spaced from said end of said tension bar, a strap assembly strapping said bar to said lever, and means to move said slack adjusting nut to different positions along said bar whereby the effective length of said bar relative to the lower end of said lever is adjustable.

6. In a clasp brake rigging, the combination of a single tension bar therefor having a substantially horizontal longitudinally extending portion and formed integral therewith an end turned transversely to extend substantially at right angles to said portion, a threaded bolt extending through said end and at right angles thereto and spaced from and parallel to said substantially horizontal longitudinally extending portion, a slack adjusting nut having a threaded hole therein through which said slack adjusting bolt extends, a vertical brake lever, means pivotally connecting the lower end of said lever to said slack adjusting nut, guide means attached to said slack adjusting nut and embracing said horizontal tension bar at points spaced from said end of said tension bar, and means to move said slack adjusting nut to different positions along said bar whereby the effective length of said bar relative to the lower end of said lever is adjustable, said slack adjusting bolt being turnable to move said slack adjusting nut along said bar whereby the effective length of said bar relative to the lower end of said lever is adjustable, and means to yieldingly retain said bolt in the position to which it is turned.

7. A slack adjusting connection between the lower end of a vertical brake lever and a single horizontal tension bar having an inturned end integral therewith comprising a crosshead member having connected thereto guide means adapted to engage the bar for longitudinal sliding movement of the crosshead member therealong, an elongated member adapted to be supported by the inturned end of the bar, said crosshead member having a hole through which said elongated member extends and means to move said crosshead member along said elongated member whereby the effective length of the bar relative to the lower end of the lever is adjustable.

8. A slack adjusting connection between the lower end of a vertical brake lever and a single horizontal tension bar having an inturned end integral therewith comprising a crosshead member having connected thereto guide means engageable with the bar for longitudinal sliding movement therealong, an elongated member adapted to be supported by the inturned end of the bar, means adapted to slidably strap the bar to said adjusting connection, and means to move said crosshead member along said elongated member whereby the effective length of the bar relative to the lower end of the lever is adjustable.

9. An adjustable connection between the lower end of a vertical brake lever and a single horizontal tension bar having an inturned end integral therewith comprising a strap assembly adapted to be connected to the lever so as to embrace the bar, a member to which the lower end of the lever is adapted to be fastened including guide means adapted to slidably cooperate with the bar, and means adapted to be interposed between said member and the inturned end adapted to move said member longitudinally relative to the bar.

References Cited in the file of this patent
UNITED STATES PATENTS

| | | |
|---|---|---|
| 585,223 | McGuire et al. | June 29, 1897 |
| 2,015,881 | Alden et al. | Oct. 1, 1935 |
| 2,097,316 | Whitford | Oct. 26, 1937 |
| 2,104,787 | Blomberg | Jan. 11, 1938 |
| 2,119,505 | Shaver | May 31, 1938 |
| 2,122,975 | Christianson | July 5, 1938 |
| 2,425,979 | Bachman | Aug. 19, 1947 |